United States Patent [19]

Ollivaud et al.

[11] Patent Number: 4,766,934
[45] Date of Patent: Aug. 30, 1988

[54] CLOSURE HEAD FOR A HYDRAULIC TUBE-TESTING BENCH

[75] Inventors: Bernard Ollivaud, Launay le Cellier; Philippe Blot, Nantes, both of France

[73] Assignee: Alsthom, Paris, France

[21] Appl. No.: 83,112

[22] Filed: Aug. 10, 1987

[30] Foreign Application Priority Data

Aug. 14, 1986 [FR] France .............................. 86 11765

[51] Int. Cl.⁴ ............................................. G01M 3/28
[52] U.S. Cl. ...................................... 138/90; 138/89; 73/49.1; 73/49.8; 277/34
[58] Field of Search .................... 138/89, 90; 277/34, 277/2, 27, 73, 72 R, 71, 79; 220/240; 73/49.5, 49.1, 49.8, 47

[56] References Cited

U.S. PATENT DOCUMENTS

| | | | |
|---|---|---|---|
| 2,818,914 | 1/1958 | Thomann et al. | 220/240 X |
| 3,331,238 | 7/1967 | Kost et al. | 73/49.5 |
| 3,803,901 | 4/1974 | McConnell | 138/90 X |
| 4,194,389 | 3/1980 | Laging | 73/49.1 |
| 4,523,455 | 6/1985 | Zacharias | 138/90 |
| 4,537,407 | 8/1985 | Jansen et al. | 277/34 X |
| 4,646,559 | 3/1987 | Taelke | 73/49.8 X |
| 4,646,561 | 3/1987 | Taelke | 73/49.5 |

FOREIGN PATENT DOCUMENTS

| | | | |
|---|---|---|---|
| 1040818 | 10/1958 | Fed. Rep. of Germany | 138/90 |
| 1114651 | 10/1961 | Fed. Rep. of Germany | 73/49.5 |
| 1120760 | 12/1961 | Fed. Rep. of Germany | 73/49.5 |
| 1237219 | 6/1960 | France | 220/240 |

Primary Examiner—James E. Bryant, III
Attorney, Agent, or Firm—Sughrue, Mion, Zinn, Macpeak and Seas

[57] ABSTRACT

A closure head (2) for a hydraulic tube-testing bench includes a head body (4) including a first bore (5) into which one end of a tube (1) may be freely inserted. A second bore (11) of larger diameter than the first bore has a resilient sealing ring (10) inserted at the end thereof. A fluid under pressure is conveyed into a chamber (40) constituted between the outer periphery of the sealing ring and the second bore enabling the sealing ring to be contracted against the tube. The sealing ring is prevented from moving axially on its side furthest from the end of the tube by an annular series of thrust sectors (13) which are independent from said sealing ring. The sectors are clamped against the tube while also enabling them to be retracted away therefrom. The sectors are axially retained on their sides furthest from said sealing ring. The closure head is characterized in that axial retaining of the thrust sectors is achieved by comprise a packing press (18) fixed to the head body, and a rubbing plate (19) in contact with the packing press and which includes a circular peripheral rim (20) which engages, when the thrust sectors are in the retracted position, in a groove (21) provided in the periphery of the thrust sectors.

4 Claims, 8 Drawing Sheets

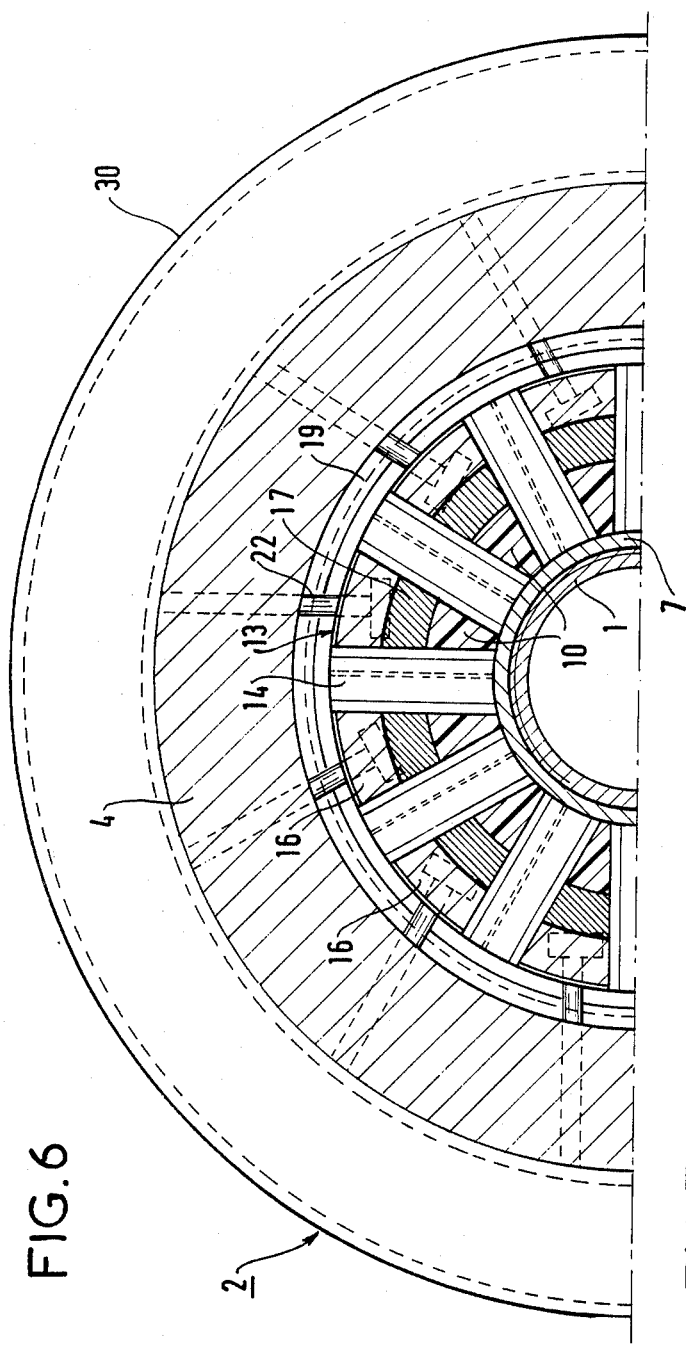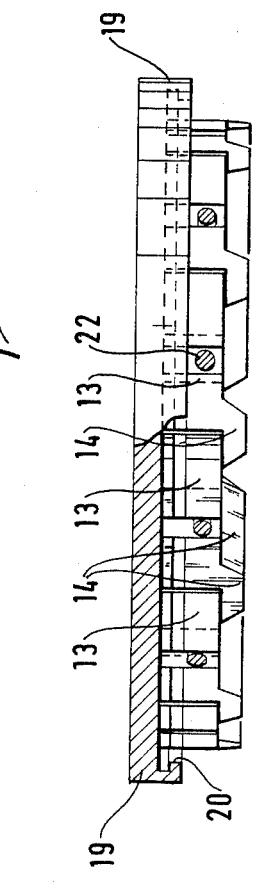
FIG.6
FIG.7

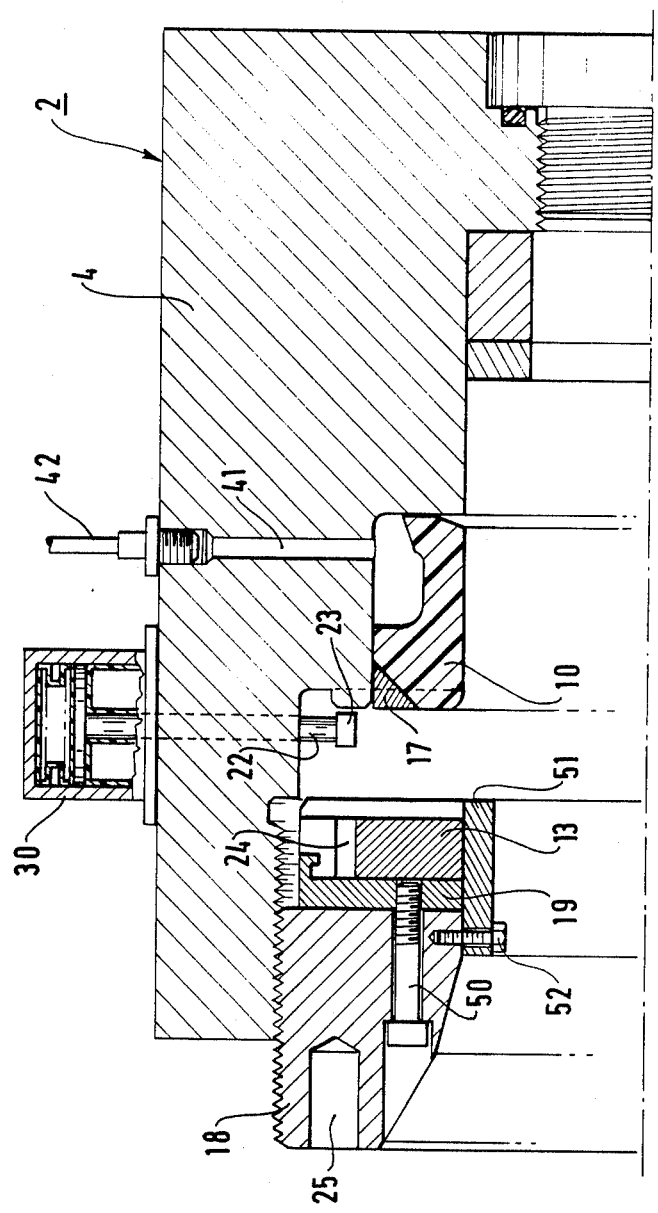

CLOSURE HEAD FOR A HYDRAULIC TUBE-TESTING BENCH

The present invention relates to a closure head for a hydraulic tube-testing bench.

BACKGROUND OF THE INVENTION

Tubes intended in particular for the oil industry or for transporting fluids, are generally tested at high pressures prior to being delivered to end users, thereby setting up stresses in the tubes close to their elastic limits.

In order to perform this hydraulic test, a tube is placed on a bench having a closure head at each end of the tube for closing the end of the tube and for sealing it.

One of the closure heads is fed with water in order to put the tube under test. The structure of the bench is suitable for withstanding the large thrusts induced by the test hydraulic pressure acting on the closed surface at each end.

Thus, the present invention relates to a closure head for a hydraulic tube-testing bench, the head comprising a head body including a first bore into which one end of a tube may be freely inserted, a second bore of larger diameter than the first bore with a resilient sealing ring being inserted at the end of the second bore, means for conveying a fluid under pressure into a chamber constituted between the outer periphery of the sealing ring and said second bore enabling the sealing ring to be contracted against said tube, said sealing ring being prevented from moving axially on its side furthest from the end of the tube by an annular series of thrust sectors which are independent from said sealing ring, said sectors including sliding control means enabling them to be clamped against the tube and also enabling them to be retracted away therefrom, said sectors including axial retention means on their sides furthest from said sealing ring.

A closure head constituted in this way is disclosed in U.S. Pat. No. 4,537,407.

However, the sealing ring 10 is accessible with difficulty and a plurality of parts must be disassembled whenever it is to be replaced and this must be done for all of the sectors separately.

The aim of the present invention is to provide a closure head enabling the sealing ring to be replaced very quickly and easily. It also aims at providing improved retention of the sealing ring by leaving no interstitial passages, and finally to make use of only one control for tightening and untightening the thrust sectors.

SUMMARY OF THE INVENTION

The invention thus provides a closure head as defined above and including the improvement whereby the axial retaining means for the thrust sectors comprise a packing press fixed to said head body, and a rubbing plate which is in contact with the packing press and which includes a circular peripheral rim which engages, when the thrust sectors are in the retracted position, in a groove provided in the periphery of said thrust sectors.

Advantageously, said sectors overlap partially circumferentially and an anti-extrusion ring of wedge-shaped section is fitted in said second bore between the sealing ring and the said thrust sectors.

BRIEF DESCRIPTION OF THE DRAWINGS

An embodiment of the invention is described, by way of example with reference to the accompanying drawings, in which:

FIG. 6 is a section on VI—VI of FIG. 5;

FIG. 7 is a fragmentary view from above relative to FIG. 6 showing the thrust sectors on their own in their tightened position, together with the rubbing plate in partial section;

FIG. 11 shows a closure head in accordance with the invention in a position during thrust sector disassembly.

MORE DETAILED DESCRIPTION

Figure 1:
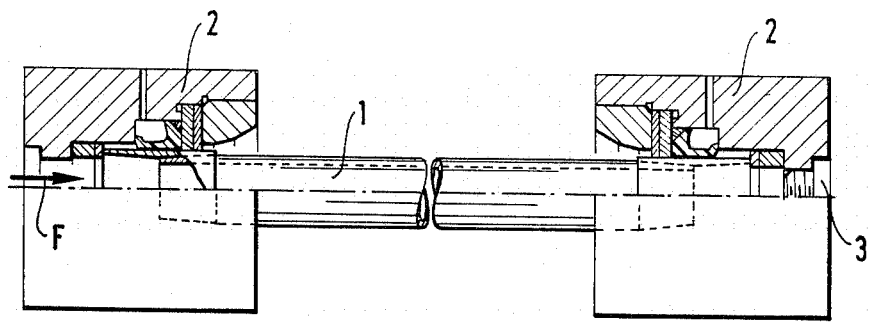
FIG. 1 is a diagram showing a tube to be tested fitted with a closure head in accordance with the invention at each of its ends.

FIG. 1 shows a tube 1 which is to be tested for sealing, and which is subjected to a hydraulic high pressure test for this purpose. To do this, each end of the tube is covered by a closure head 2 comprising a sealing system which is applied around the outside periphery of the tube. Hydraulic pressure is applied to the tube in the direction of arrow F from the base of the closure head shown to the left in FIG. 1, with the base of the closure head to the right of the figure naturally being closed, e.g. by a plug 3. It would also be possible to apply pressure from both ends.

In the embodiment described, the drawings show a closure head whose base is closed by a plug 3. It is therefore assumed that hydraulic fluid is applied solely via the base of the closure head situated at the other end of the tube.

Naturally, each of the closure heads 2 is fixed to the frame of a test bench suitable for moving them away from and towards each other and for withstanding the large axial thrusts to which the closure heads are subjected during testing.

With reference to FIGS. 3 to 11, a closure head in accordance with the invention comprises a head body 4 with a first bore 5 and having a base which is closed by a screw plug 3 and a sealing ring 6. One end of the tube 1 to be tested is inserted into the bore 5. As in the example described, one of the ends off the tube 1 is generally fitted, during hydraulic testing, with its coupling sleeve 7 for coupling it to another tube, so sealing between the tube and the closure head 2 needs to be provided around this coupling sleeve. At the other end of the tube, testing is generally done without a coupling sleeve and sealing is therefore provided directly between the tube 1 and the coupling head 2.

The tube is therefore inserted into the bore 5 until it comes into abutment against abutment parts 8 and 9.

A resilient sealing ring 10 of vaguely L-shaped section is received in the end of a second bore 11 made in the body of the head 4. This bore is of larger diameter than the first bore 5.

Figure 3:
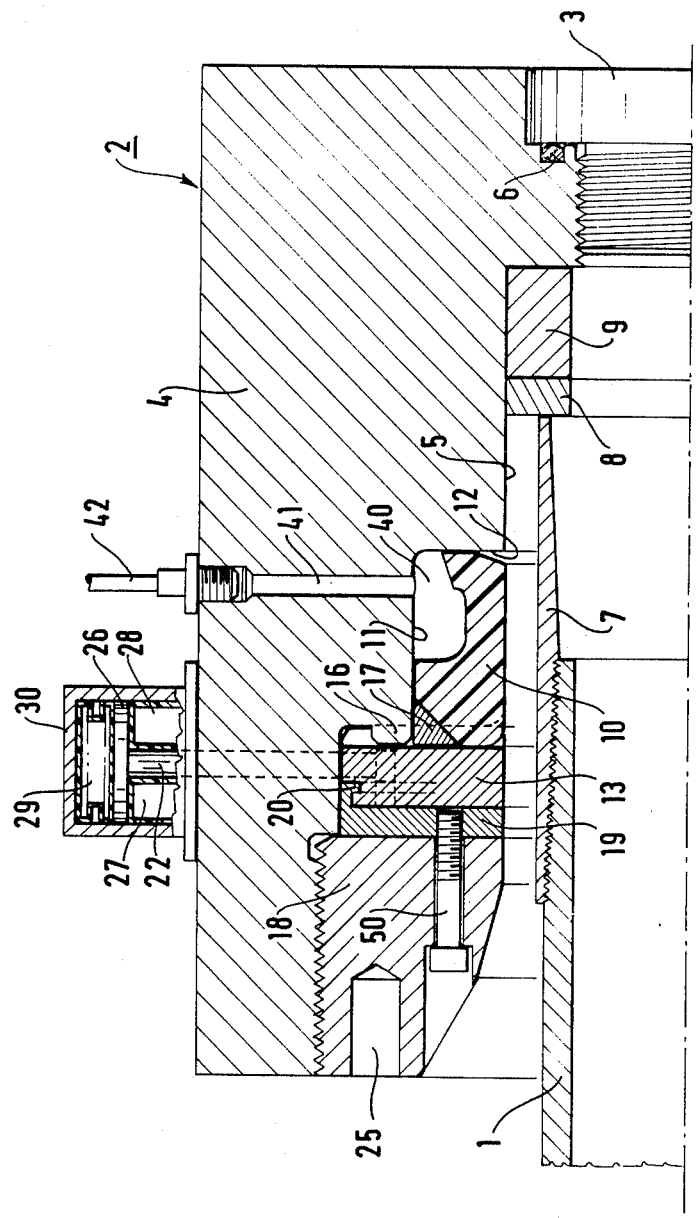
FIG. 3 is an axial half-section through a closure head in accordance with the invention in its rest position, i.e. with its sealing ring unclamped.

When the sealing ring 10 is in its rest position, as shown in FIG. 3, the inside diameter of the sealing ring 10 is not less than the diameter of the firt bore 5 so that the tube 1 can be inserted without any danger of damaging the sealing ring.

Figure 4:
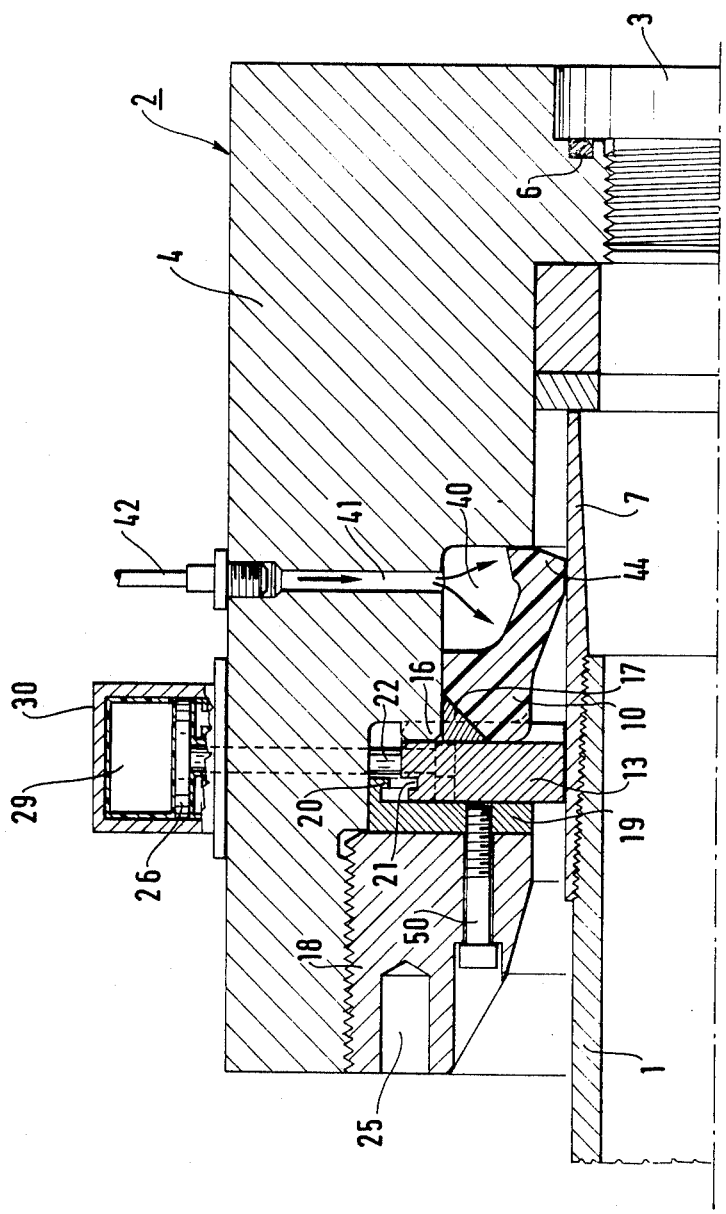
FIG. 4 is a view similar to FIG. 3 but in an intermediate position between the rest position and the sealed operating position.
Figure 5:
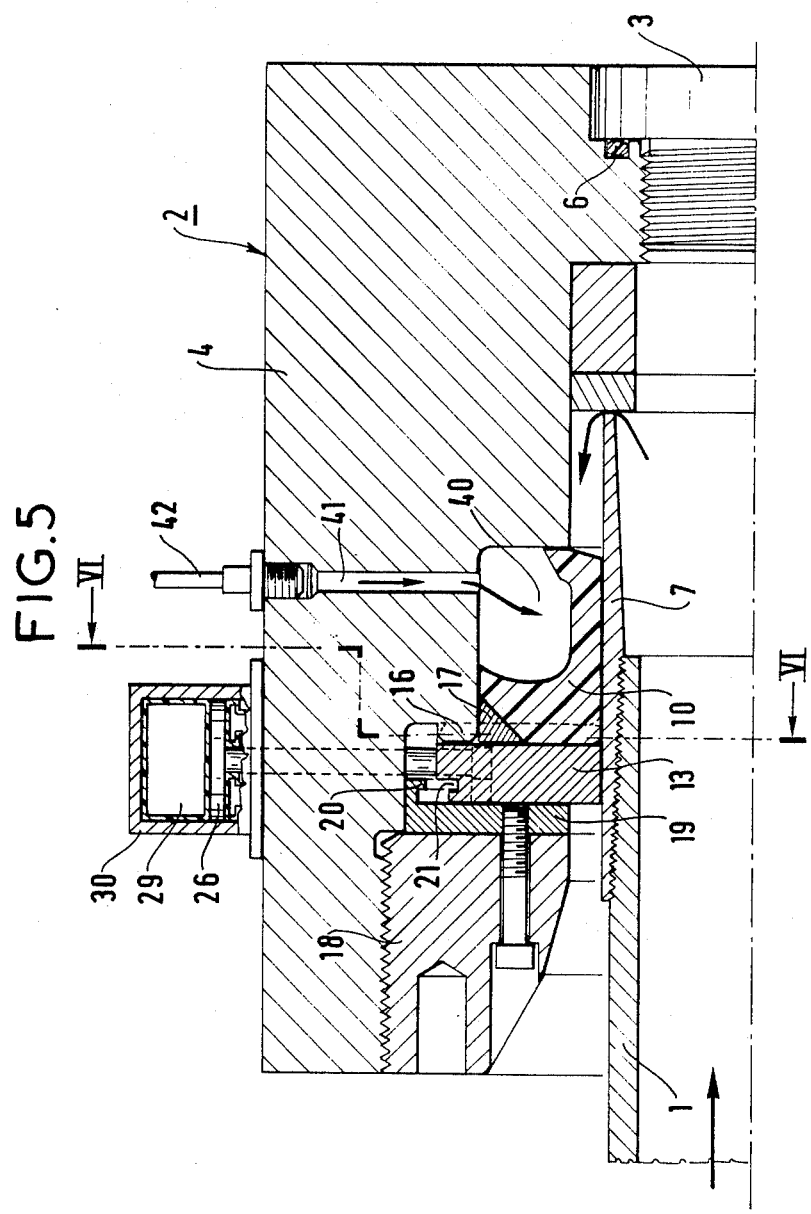
FIG. 5 shows the closure head in its sealed operating position with the sealing ring in its clamped position.

The tube end side of the sealing ring 10 is held axially against the end 12 of the second bore 11, and the other side of the sealing ring is pressed against an annular series of thrust sectors 13 which are independent from the sealing ring 10 and which overlap partially circumferentially. These sectors, when in the retracted rest position as shown in FIG. 3, are capable of moving into a clamping position about the tube (i.e. the sleeve 7 in the example described) by moving towards one another radially and circumferentially, with their overlapping portions sliding over one another and increasing their area of overlap (which naturally reduces when they move away from the tube). In FIGS. 4 and 5, the thrust sectors 13 are in the contracted position against the sleeve 7.

Figure 10:
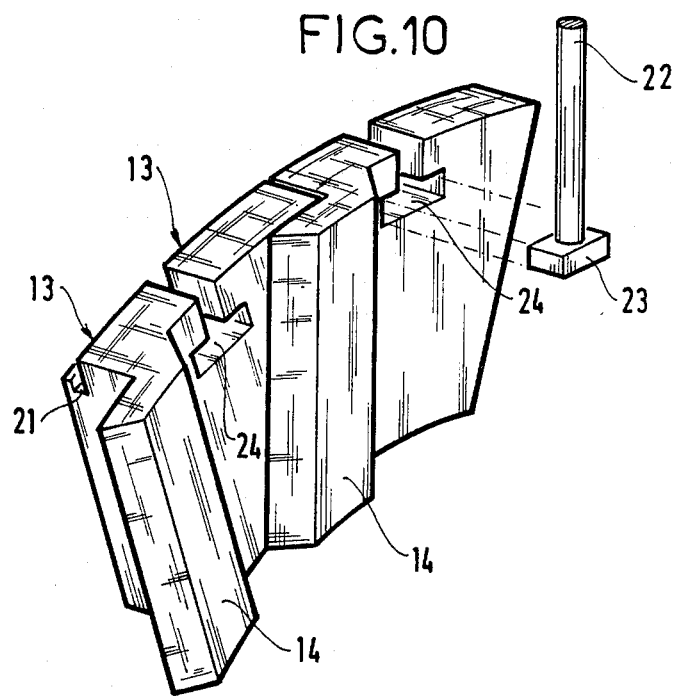
FIG. 10 is a perspective view of two thrust sectors.

FIG. 10 is a perspective view of two of these sectors 13 in a relative position which corresponds to maximum clamping. It can be seen that the overlapping portions are in abutment against one another.

While the thrust sectors 13 are in motion, they are guided by their leading circumferential overlapping portions 14 which slide in complementary shaped trapezoidal grooves 15 (FIG. 8) made in the body of the head 4. Portions of material 16 between these grooves 15 can be seen in FIGS. 3, 4, and 5.

An anti-extrusion ring 17 of wedge-shaped cross-section (a rectangular isosceles triangle section) is also inserted in fitted manner in the second bore 2 between the resilient sealing ring 10 and the thrust sectors 13. This anti-extrusion ring prevents the sealing ring from being extruded radially. It also includes grooves corresponding to the leading portions 14 of the thrust sectors 13, thereby enabling them to slide radially.

Similarly, the sealing ring 10 also includes complementary grooves to said overlapping leading portions 14 of the thrust sectors.

Figure 8:
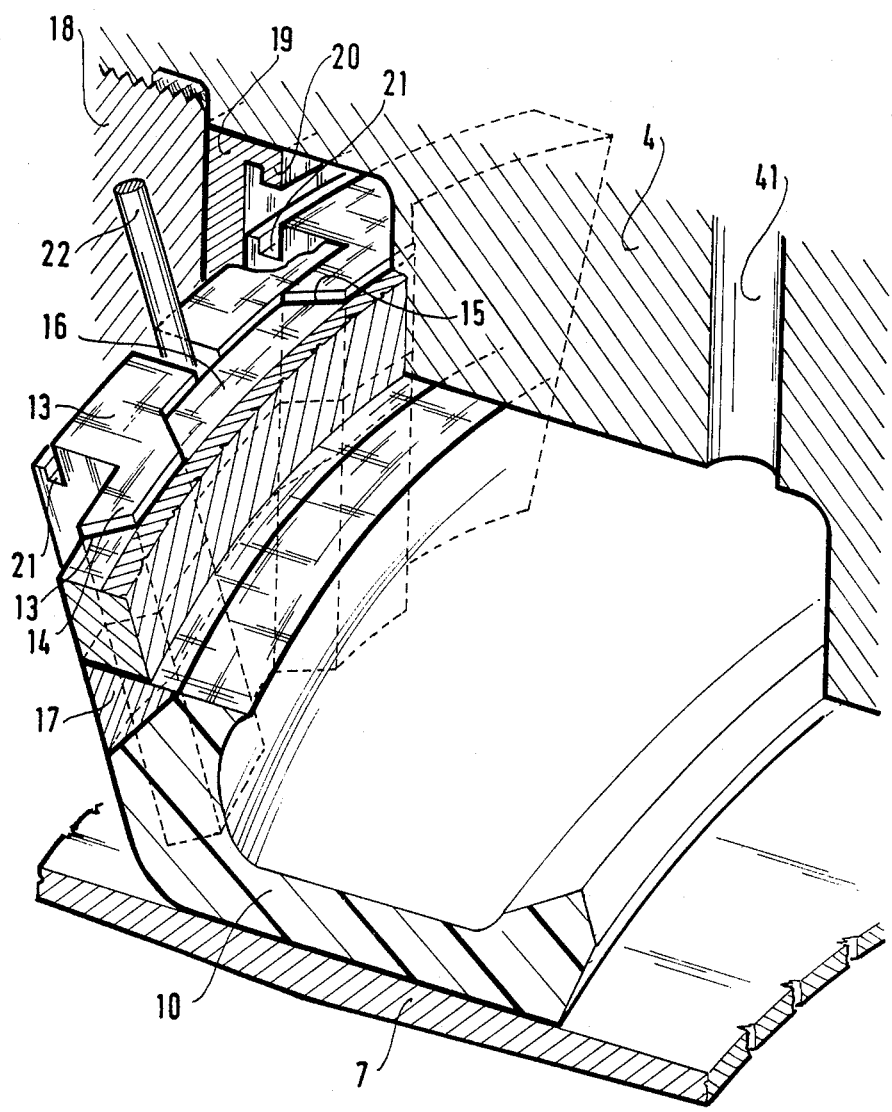
FIG. 8 is a fragmentary perspective view showing the shape of some of the parts more clearly.
Figure 9:
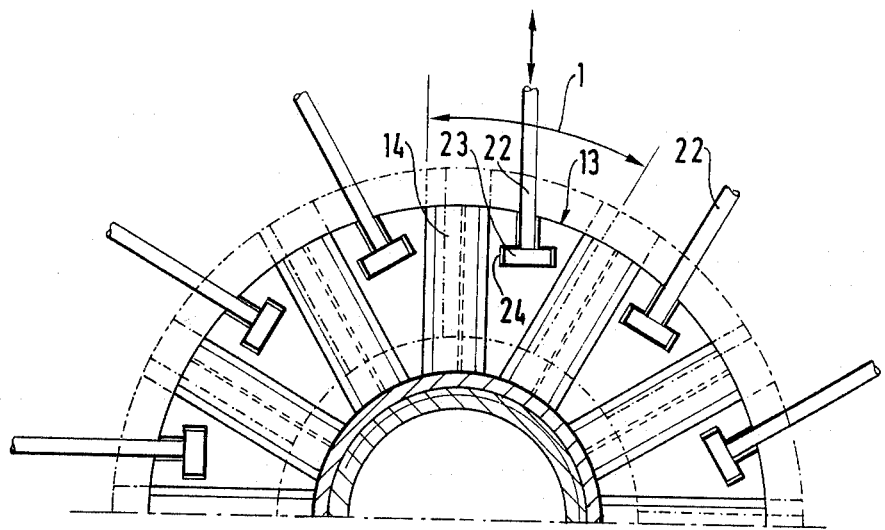
FIG. 9 is a half-view showing the thrust sectors on their own clamped about the tube together with their operating rods; the dot-dashed lines show the sectors in their retracted position.

The perspective of FIG. 8 shows the shapes and the relative dispositions of the various arts more clearly. In this perspective view, the sectors 13 and the sealing ring 10 are shown in the contracted position where they are clamped against the sleeve 7, i.e. in the same position as shown in FIG. 5.

The thrust sectors 13 are axially retained by a packing press 18 screwed into the body of the head 4. A rubbing plate 19 is fixed to the packing press 18 by screws such as 50. The thrust sectors 13 slide over the rubbing plate 19 when they move.

The rubbing plate 19 includes a circular peripheral rim 20 which, when the thrust sectors 13 are in their retracted position (FIG. 3) engages in a groove 21 (FIGS. 4, 5) made in the outer periphery of the thrust sectors. This disposition makes it possible to disassemble the thrust sectors 13 rapidly, for example in order to change sealing rings 10. To do this, starting with no tube 1 placed on the test bench and with the closure head in its rest position with its sectors retracted and the sealing ring in its rest position as well, a disassembly bush 51 is put into place by being fixed to the packing press 18 by screws such as 52, and the packing press 18 is then unscrewed, thereby rotating and axially displacing the rubbing plate 19 whose rim 20 rotates inside the grooves 21 of the thrust sectors while pulling them axially. The thrust sectors are prevented from rotating by virtue of the grooves 15 which receive the portions 14 of the sectors, and also because of the thrust sector operating rods 22 whose ends 23 are received in T-section grooves 24 provided in the sectors 13, as can be seen clearly in FIG. 10. The bush 51 prevents the sectors 13 from falling, and by giving its end an appropriate shape, it may also serve as a tool for dismantling the packing press 18.

FIG. 11 shows the device while being disassembled with the thrust sectors 13 already disengaged from the ends 23 of the operating rods 22. The packing press 18 includes blind holes such as 25 suitable for receiving dismantling pegs.

The thrust sectors 13 are operated by means of rods 22 each of which has a plate 26 provided for this purpose at its outer end. All of the plates 26 press inwardly against two toroidal chambers 27 and 28 made of elastomer which surround the head 4, and outwardly all of the plates 26 are surrounded by another elastomer toroidal chamber 29. The assembly is contained in a housing 30 fixed on the body of the head 4.

The thrust sectors 13 are closed by putting the outer toroidal chamber 29 under pressure while evacuating the inner toroidal chambers 27 and 28. Conversely, the thrust sectors 13 are retracted by applying pressure to the inner toroidal chambers 27 and 28 while evacuating the outer toroidal chamber 29.

Figure 2:
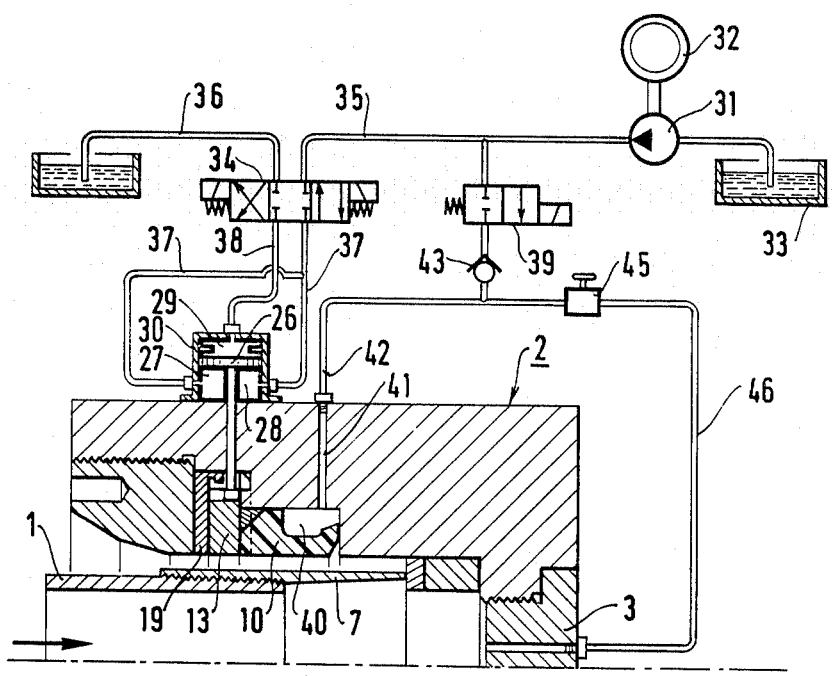
FIG. 2 is a diagram of a closure head in accordance with the invention showing its hydraulic control circuit.

FIG. 2 shows the hydraulic control circuit which is now described while describing the operation of the device with reference to FIGS. 3, 4, and 5.

Once each end of the tube has been inserted into a closure head, the thrust sectors 13 are clamped around the sleeve 7. To do this, a pump 31, driven by a motor 32 sucks water from a tank 33 and delivers it into the outer toroidal chamber 29 via an electrically operated valve 34 which is excited in such a manner as to interconnect four ducts 35 to 38 in the manner shown by the arrows to the left of the valve, thereby interconnecting 35 & 38 and 37 & 36. The thrust sectors 13 are thus pressed against the sleeve 7. Almost simultaneously, an electrically operated valve 39 is excited so as to feed the annular chamber 40 surrounding the sealing ring 10. To this end, a channel 41 is provided through the body of the head 4 to connect the chamber 40 to a duct 42 leading to the outlet from the valve 39 via a non-return valve 43. By virtue of this pressure (which may be about 50 bars to 100 bars, for example), the sealing ring 10 deforms and the assembly takes up the position shown in FIG. 4 where the sectors 13 close the annular space between the sleeve 7 and the closure head, and where the lip 44 of the sealing ring 10 comes into contact with the sleeve, thereby initiating sealing.

Once this initial sealing pressure has been reached in the chamber 40, the tube is filled with water for the watertightness test and the test pressure is raised, e.g. up to 1500 bars. As soon as the pressure in the tube reaches the initial sealing pressure existing in the chamber 40, a valve 45 situated in a duct 46 connecting the inside of the tube to the duct 42 opens and puts the inside of the tube into communication with the chamber 40 so that the pressure therein rises simultaneously with the pressure existing inside the tube.

Under the effect of this very high pressure, the sealing ring 10 is pressed firmly and completely against the sleeve 7, thereby eliminating any possibility of water leaking away. In addition, since the sealing ring 10 is completely enclosed there is no danger of it being extruded. FIG. 5 shows the final position during testing.

After testing, the water pressure is reduced simultaneously in the tube and in the chamber, 40 with the valve 45 remaining open. The sealing ring 10 returns under its own resilience to its initial shape as shown in FIG. 3. The thrust sectors 13 are unclamped by actuating the valve 37 in such a manner as to interconnect ducts 36 & 38, and 35 & 37 as shown by the righthand symbolic arrows. Naturally, during this operation, the valve 39 is closed so as to avoid feeding the chamber 40.

We claim:

1. A closure head for a hydraulic tube-testing bench, the head comprising a head body including:
   a first bore into which one end of a tube may be freely inserted;
   a second bore of larger diameter than the first bore;
   a resilient sealing ring inserted at the end of the second bore and defining a chamber between the outer periphery of said sealing ring and said second bore;
   means for conveying a fluid under pressure into said chamber for causing said sealing ring to contract against said tube;
   an annular series of thrust sectors which are independent from said sealing ring and which are disposed on the side of said sealing ring remote from the inserted end of the tube, thereby preventing said sealing ring from moving axially, said sectors including radial sliding control means for causing said sectors to be clamped radially against the tube and also for radially retracting them away from said tube, said sectors further including axial retention means on their sides remote from said sealing ring for restraining said sectors from axial movement;
   said closure head including the improvement whereby said axial retention means for the thrust sectors comprise:
   a packing press fixed to said head body on the side of the head body remote from said sealing ring; and
   a rubbing plate in contact with the packing press and terminating in a circular peripheral rim radially overlying the outer periphery of the thrust sectors, and said thrust sectors including circumferential grooves provided in the periphery of the thrust sectors sized to and receiving the circular peripheral rim when the thrust sectors are radially retracted.

2. A closure head according to claim 1, wherein said thrust sectors overlap partially circumferentially and wherein an anti-extrusion ring of wedge-shaped section is fitted in said second bore between the sealing ring and said thrust sectors to prevent radially outward extrusion of said sealing ring in the area of contact between said sealing ring and said series of thrust sectors.

3. A closure head according to claim 1, wherein each thrust sector is provided with an operating rod passing radially through the body of said head and having one end with a head terminating in a T-shaped head and wherein each thrust sector has a radially outer periphery provided with a T-shaped groove engaging a T-shaped head of a corresponding operating rod, each operating rod being provided at its opposite end with a plate, a housing surrounding the closure head body, said housing receiving said plates on the opposite ends of said operating rod, at least one inner resilient toroidal chamber situated between the head body and said plate of each thrust sector and an outer resilient toroidal chamber situated between said plates and an outer peripheral wall of said housing, and wherein said closure head further includes means for selectively feeding said inner and outer resilient chambers with hydraulic fluid to effect radial displacement of said operating rods.

4. A closure head according to claim 1, wherein said means for conveying a fluid under pressure into said chamber partially defined by said sealing ring comprise firstly a communication path including a valve and extending between said chamber and the inside of the tube which is subjected to a hydraulic test pressure during testing, and secondly an independent supply of pressurized fluid for providing initial sealing of said sealing ring about said inserted tube end.

* * * * *